(12) United States Patent
Rossi

(10) Patent No.: US 6,230,612 B1
(45) Date of Patent: May 15, 2001

(54) STEAMER WITH LATERAL WATER FILL

(75) Inventor: Fabrice Rossi, Fontaine Francaise (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 09/600,600

(22) PCT Filed: Nov. 19, 1999

(86) PCT No.: PCT/FR99/02839

§ 371 Date: Jul. 19, 2000

§ 102(e) Date: Jul. 19, 2000

(87) PCT Pub. No.: WO00/30510

PCT Pub. Date: Jun. 2, 2000

(30) Foreign Application Priority Data

Nov. 19, 1998 (FR) .................................................. 98 14737

(51) Int. Cl.⁷ .................................................. A47J 27/04
(52) U.S. Cl. .................................. 99/446; 99/345; 99/400; 99/403; 99/410; 99/413; 99/417; 126/20; 126/369; 219/401; 219/415
(58) Field of Search ...................... 99/339, 340, 345–347, 99/403, 418, 410–417, 444–446, 400, 450, 401, 468, 473, 474, 330, 331; 126/369, 369.2, 20, 381.1; 219/401, 415, 442; 426/418, 509–511, 523; 220/228, 212.5, 4.26, 753, 763–765, 776

(56) References Cited

U.S. PATENT DOCUMENTS

| | | |
|---|---|---|
| 2,622,591 | 12/1952 | Bramberry . |
| 3,908,111 * | 9/1975 | Du Bois et al. ...................... 219/442 |
| 4,075,939 | 2/1978 | Horn et al. . |
| 4,148,250 * | 4/1979 | Miki et al. ............................... 99/403 |
| 4,426,923 * | 1/1984 | Ohata ...................................... 99/468 |
| 4,672,179 * | 6/1987 | Onishi et al. ...................... 99/403 X |
| 4,739,698 * | 4/1988 | Allaire .................................... 99/410 |
| 4,982,656 * | 1/1991 | Stone ................................. 99/450 X |
| 5,092,229 * | 3/1992 | Chen ................................. 99/413 X |
| 5,189,947 * | 3/1993 | Yim ........................................ 99/415 |
| 5,400,701 * | 3/1995 | Sham ...................................... 99/410 |
| 5,893,319 | 4/1999 | Bois . |

FOREIGN PATENT DOCUMENTS

| | | |
|---|---|---|
| 382 440 | 10/1923 | (DE) . |
| 2 759 274 | 8/1998 | (FR) . |

* cited by examiner

Primary Examiner—Timothy F. Simone
(74) Attorney, Agent, or Firm—Browdy & Neimark

(57) ABSTRACT

Heating part of a steamer, composed of a base structure (1), a heating body (2), a main water reservoir (4) communicating with the heating body (2) and enclosing an air volume, a lid (10) closing the reservoir (4), a filling orifice (8) opening on an exterior wall of at least one of the base (1) and the lid (10), a wall (5) closing at least one part of the air volume enclosed by the water reservoir (4) and disposed between the heating body (2) and of the filling orifice (8), the lid (10) having at least one opening (14) provided for the passage of steam toward a cooking receptacle disposed above the lid. The wall (5) descends into a reduced height zone (17) connected to the heating body (2') by a slope (23, 23') having a peak or a rib (24, 24') having a peak , the wall (5) descending into the reduced height zone (17) to a height lower than that of the peak of the slope (23, 23') or of the rib (24, 24'), the filling orifice (8) on the one hand and the slope (23, 23') or the rib (24, 24') on the other hand being disposed to one side and the other of the wall (5).

9 Claims, 4 Drawing Sheets

STEAMER WITH LATERAL WATER FILL

Figure 1:
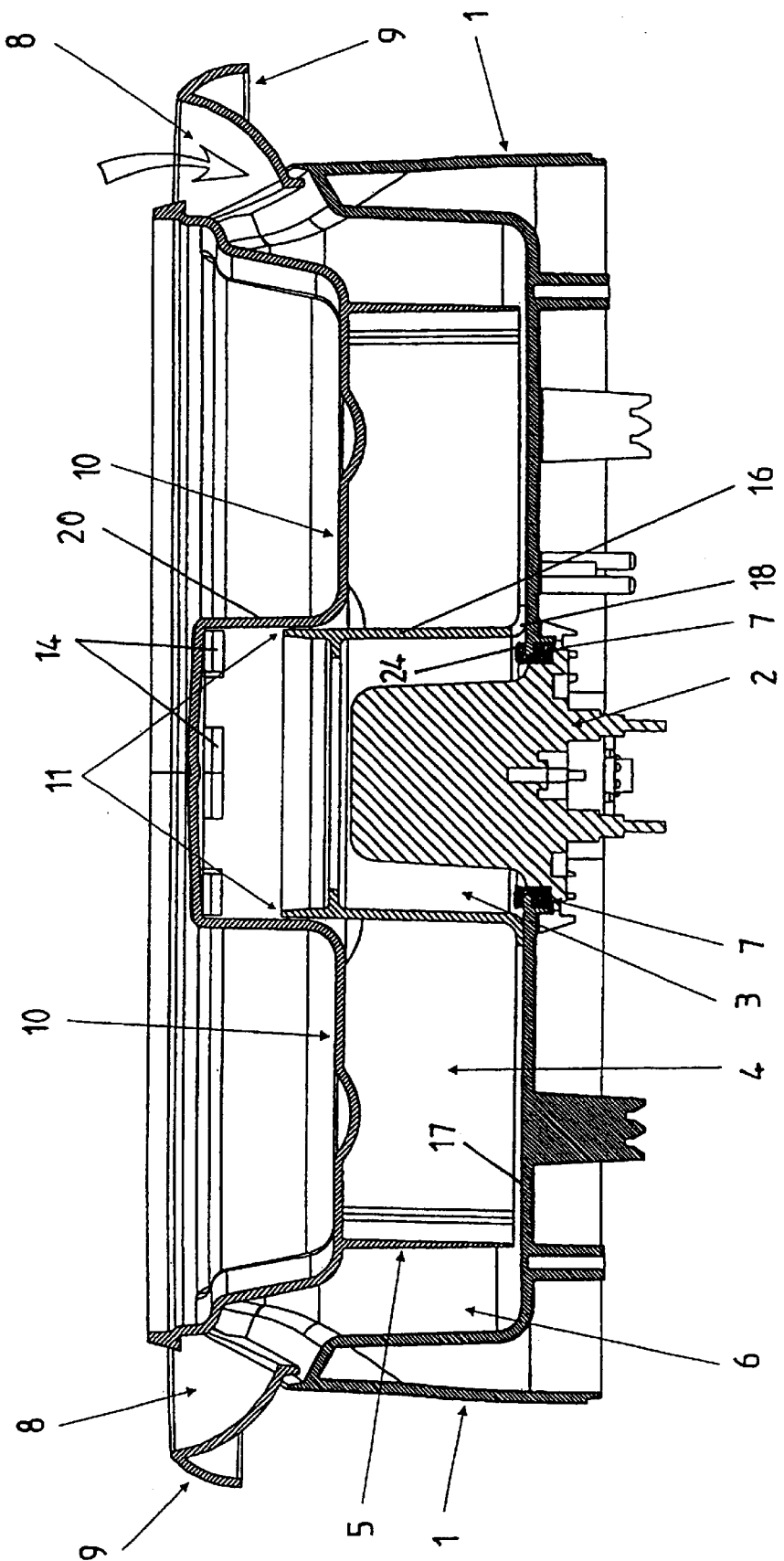

This application is the national phase of international application PCT/FR99/02839 filed Nov. 19, 1999 which designated the U.S.

BACKGROUND OF THE INVENTION

The present invention concerns a cooking receptacle for household use, more particularly a steamer provided with an opening for filling water into a main reservoir.

A steamer according to the prior art generally comprises two main parts, which are the heating part and the receptacle part which will receive food that it is desired to cook. The main part, also called the base, comprises inter alia a main water reservoir and a steam generating part constituted by a heating body and a secondary reservoir of small volume where the liquid is in contact with the heating body. The two reservoirs are connected by one or more orifices located on the base of these reservoirs. Water passes from the main reservoir to the secondary reservoir via connected vessels. This arrangements permits only the volume of liquid located in the secondary reservoir to the brought to boiling, the evaporated water being compensated by the supply of water coming from the main reservoir. During cooking, the temperature of the water in the main water reservoir rises by thermal conduction through the wall separating the two reservoirs, by water that connects them and the bottom of the base. One then notes a small evaporation in the main reservoir. The increase in the temperature is greater as the level in the reservoirs drops and when several millimeters of water are attained, the temperature in the main reservoir is such that steam is generated therein. When the water in the two reservoirs is exhausted, the temperature of the heating body increases above 100° C. and an alarm signal is generated with, of course, halting of the electric supply to the heating body.

It only remains for the user to open the steamer and add more water into the main reservoir if he wishes to continue the cooking.

In order to avoid arriving at this extreme, various systems permitting filling have been proposed.

The document U.S. Pat. No. 450328 describes a two-stage pan, the upper stage of which is provided with a filling lip, providing with a cover to introduce water during cooking. This lip is placed on the upper part, i.e., relatively far from the production of steam, so that, when opening the lid, a steam flow of weak intensity escapes. This solution has as a drawback that cold refill water flows on the foods disposed on the cooking grid before arriving at the boiling water reservoir. There result therefrom damage to delicate foods such as fish, the pieces of which are carried through the grid into the reservoir. In addition, although placed in the upper part, some steam can escape during opening of the lid since this opening is situated directly in the cooking enclosure and causes the user to suffer burns.

The document DE 271877 describes a cooking assembly for fruits and vegetables with a device for recovering juices. A lateral opening provided with a closure permits refilling of the water reservoir. Since this opening ends directly in the boiling water tank, the water reservoir can only be filled when cold, since if one attempts to open this opening during cooking, the flow of steam would provoke serious burns and prevent the passage of cold water.

In the Document DE 382440, we find the description of a cooking assembly for generating steam. The particularity of this assembly is that the steam generated is condensed on the walls of the bell-shaped glass cover enclosing everything, this condensation water returning into the main reservoir to be again transformed into steam. The problem of addition of water is thus not presented since the water is recycled in a closed circuit. No passage is provided between the exterior and the interior of the cover; the presence of water around this cover serves to prevent the steam from escaping.

In the document FR 2759274, we find the description of a steam cooker having a heating part comprising a base structure with a water reservoir connected in its lower part to a steam producing chamber placed under the reservoir, steam escaping by the upper extremity of a tube passing through the bottom of the water reservoir. A filling orifice opens at the exterior wall of the base. A lid closing the reservoir has an opening provided for the passage of a shaft for evacuating steam issuing from the steam production chamber toward a cooking receptacle disposed above the lid. Such an appliance permits filling of the reservoir during production of steam but presents the drawback of having a shaft on which the lid is mounted. This arrangement interferes with removal of the lid and is particularly penalizing when the lid forms a cooking liquid recuperator. In addition, the steam production chamber is disposed under the water reservoir, which increases the height of the heating base. A check valve is necessary to prevent flow of steam back into the cold water reservoir. In addition, since the steam production chamber is not visually accessible, detection of scaling of said chamber is not easy.

It is noted that the known solutions do not permit extracting a teaching for the creation of a heating part or a base of a steamer permitting filling of the water reservoir without risk during cooking while preventing steam from escaping, the utilization of which is simple.

BRIEF SUMMARY OF THE INVENTION

The object of the present invention is thus a configuration of the base allowing filling of the reservoir without any risk of burning for the user while preventing steam from escaping through the filling orifice, and permitting an easy utilization.

Another object of the present invention is a configuration of the base permitting the height of said base to be limited.

According to the invention, these objects are achieved with a heating part of a steamer, comprising a base structure, a heating body, a water reservoir in association with a heating body, a lid closing the reservoir, a filling orifice opening at an exterior wall of the base and/or of the lid, a wall covering at least one part of the air volume of the water reservoir being disposed between the heating body and the filling orifice, the lid having at least one opening provided for the passage of steam toward a cooking receptacle disposed above the lid, by the fact that the wall descends into a depressed zone connected to the heating body by a slope or a rib, the wall descending into the depressed zone at a height below that of the top of the slope or rib, the filling opening on the one hand and the slope or the rib on the other hand being disposed at one side and the other of the wall.

This arrangements permits creation of a tight steam barrier between the heating body producing the steam and the filling opening. In effect, the water remaining present in the depressed zone cannot return to the first zone in order to be vaporized. If necessary, several filling orifices can be disposed opposite one or several depressed zones. The wall closes the volume where the steam is produced but does not prevent water from circulating freely from one side to the other of the wall. This is because the lower part of the wall is immersed in the water which serves to obstruct steam. It is necessary to recall that this steam is not under pressure because it can escape through the opening or openings arranged in the lid. The particular configuration of the invention permits a good functioning of the water seal until the end of the cooking process to be guaranteed.

Advantageously, the heating part includes a secondary water reservoir in which the water is in direct contact with the heating body, the main reservoir being connected in its lower part with the secondary reservoir, the heating body being disposed at the interior of the secondary reservoir. This arrangements permits the height of the heating part to be reduced.

According to a preferred embodiment, the wall extends from the lower face of the lid. This arrangements permits simplification of the construction of the heating part, and facilitates cleaning as well as use. The wall can thus extend from the lid toward the bottom of the main reservoir.

Then, according to an embodiment, the rib is disposed at the periphery of the main reservoir and arranged as a channel whose bottom is elevated with respect to the bottom of the main reservoir. This arrangement permits the volume occupied by the lid to be reduced.

According to another embodiment, the wall forms an annular skirt creating, in the main reservoir, a filling volume communicating with the filling orifice. This arrangement permits obtaining a substantial passage cross section between the wall and the bottom of the reservoir, which facilitates filling.

Advantageously then the slope or the rib is formed by an elastomer joint disposed around the heating body at the interior of the secondary reservoir. This arrangements permits reduction of the heating of the bottom of the main reservoir.

According to another embodiment, the wall forms a conduit of which the upper part constitutes the filling orifice.

The filling orifice can be integrated into gripping means mounting on the lid or the base. Several filling orifices can be provided.

Advantageously, in order to retain particles or to prevent blocking of the passages between the filling orifice or orifices and the main reservoir, as well as between the main reservoir and the secondary reservoir, the filling orifice is provided with a filter.

BRIEF DESCRIPTION OF THE INVENTION

Figure 2:
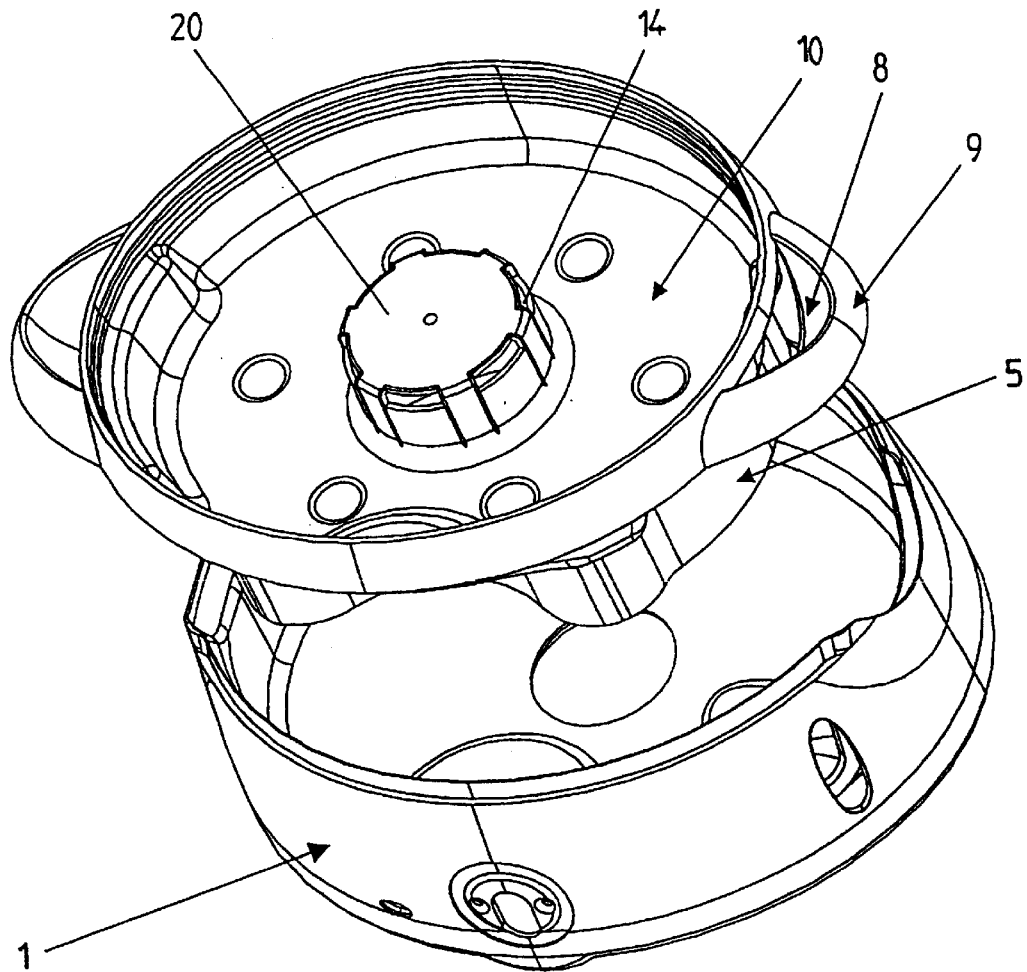
Figure 3:
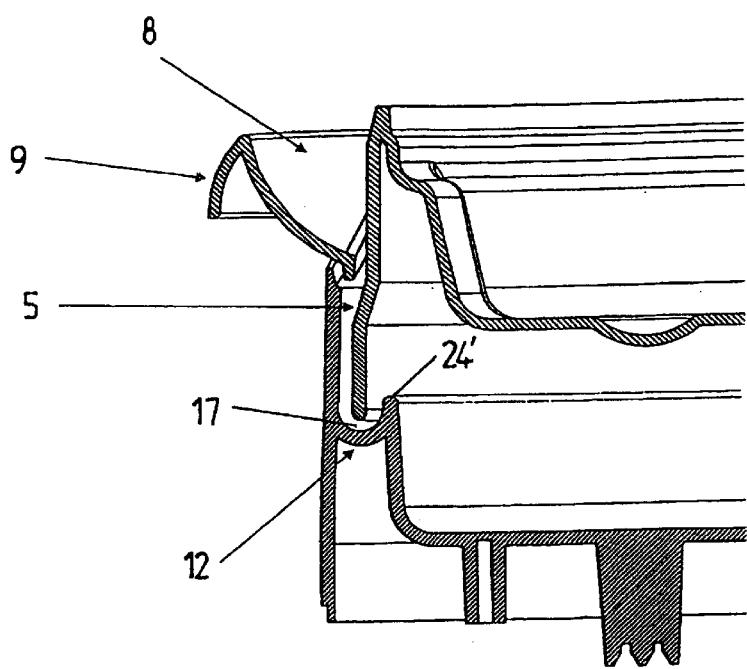
Figure 4:
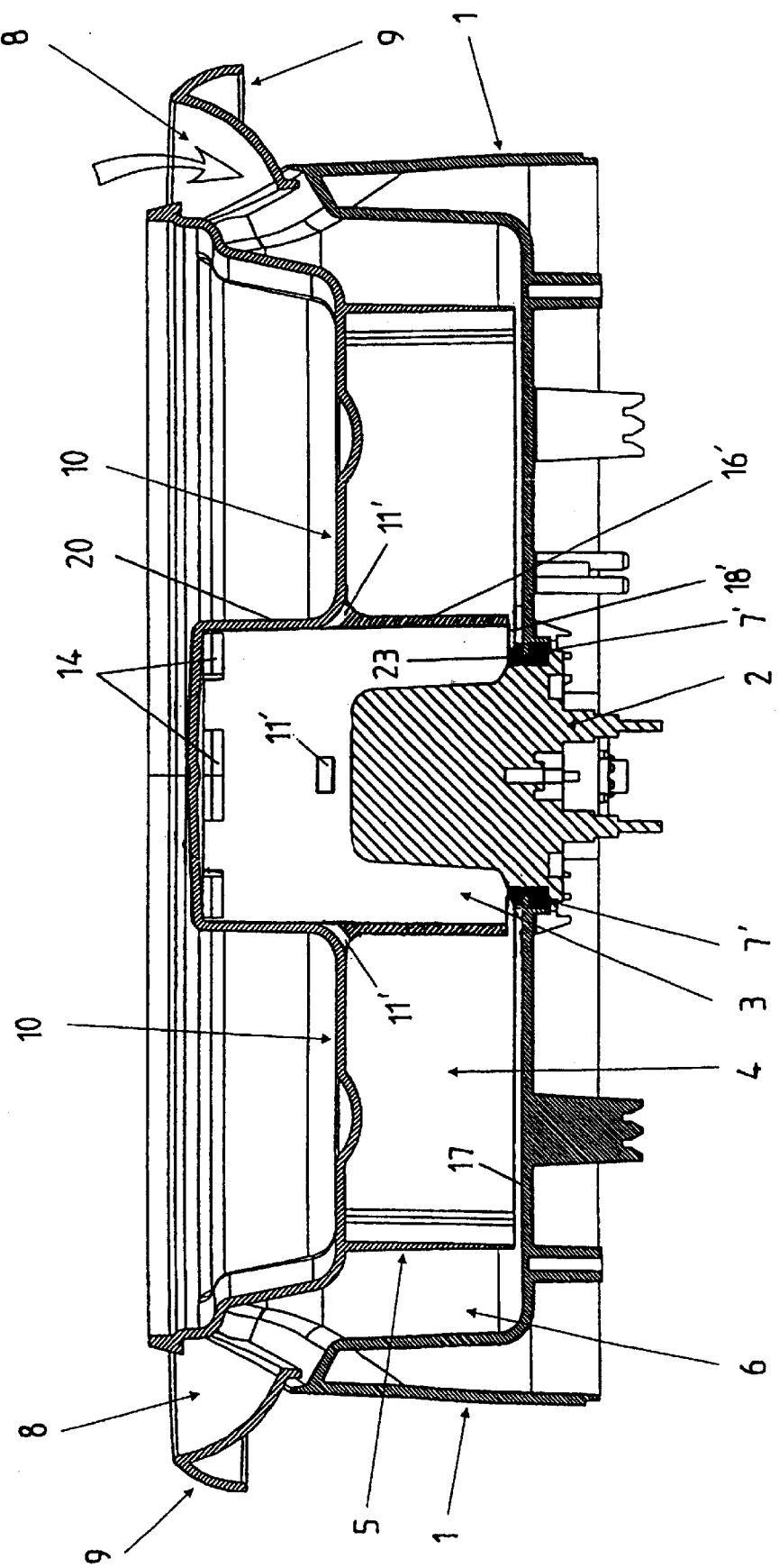
Figure 5:
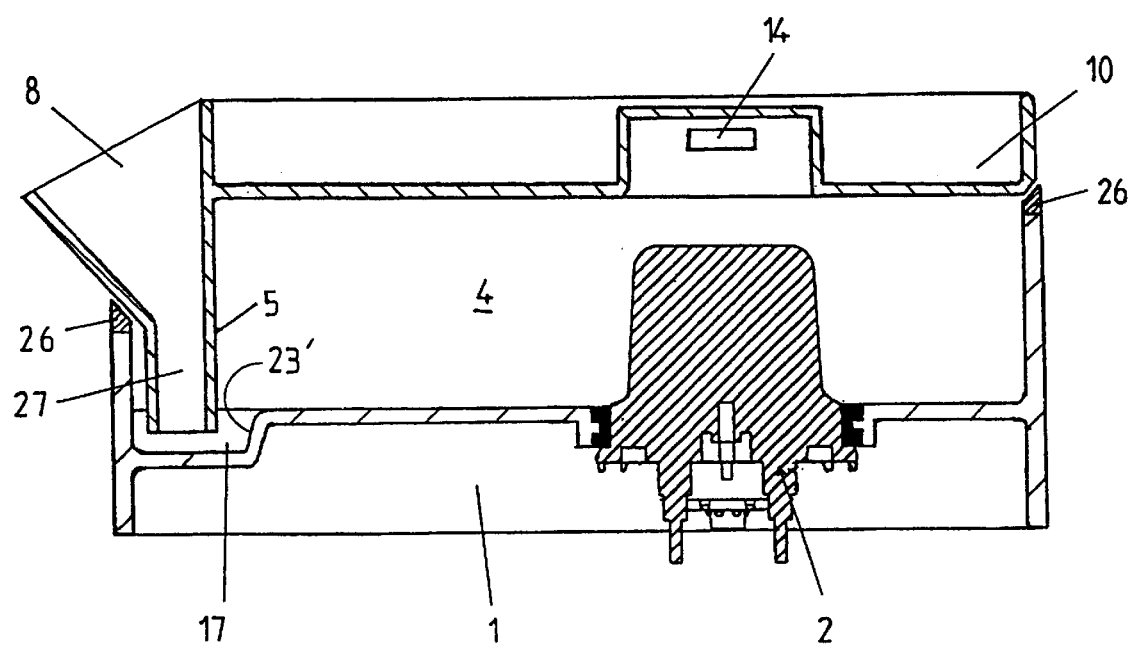

The invention will be better understood thanks to the detailed description that will follow in referring to the attached drawings in which:

FIG. 1 represents the heating the part in cross-section in one of the forms of construction of the invention, FIG. 2 represents a perspective of the lid for receiving juices and of the main reservoir, the heating body not being represented, FIG. 3 represents a cross-sectional view of another form of construction of the invention by the creation of a channel to form the water joint, FIG. 4 represents a cross-sectional view of a detail of a variant of the form of construction represented in FIG. 1, FIG. 5 represents a cross-sectional view of the heating part of another form of the invention.

DETAILED DESCRIPTION OF THE INVENTION

In FIG. 1, base 1 is the main framework on which come to be placed the other elements, particularly heating body 2 maintained by a silicone seal 7. This seal serves not only for sealing, but also for thermal isolation. Seal 7 can also be made of other elastomer materials. Surrounding heating body 2, a small volume of water is disposed in a secondary reservoir 3 and is transformed into steam. Water in this reservoir is supplied by a main reservoir 4, connected with secondary reservoir 3 at the level of their bases. The water temperature in main reservoir 4 varies as a function of the distance separating it from heating body 2, i.e. water in the vicinity of the wall separating the two reservoirs is around 80° C., this temperature decreasing with increasing distance from this heat source. Towards the exterior walls of base 1, the temperature rises to around 50° C. By this fact, steam is produced solely in a small quantity, in proximity to the heating body and accumulates above the surface of the water of the main reservoir. It is certain that, in the configuration according to the invention, this steam would come to escape towards the outside through an orifice communicating with the main reservoir. This is because, in the form of construction illustrated in FIG. 1, a wall 5 fixed with a lid 10 which is a receiver of juices, closes the volume where the steam accumulates. This wall 5 is immersed in the water, this latter element forming an obstruction to the steam. Despite the presence of this wall, water poured into orifices 8 comes to accumulate primarily in filling reservoir 6 and, through communicating conduits, can freely supply main reservoir 4.

According to the form of construction shown in FIG. 1, the wall separating main reservoir 4 from secondary reservoir 3 is formed by a ring 16 surrounding heating body 2 and having at its base at least one orifice 18 permitting secondary reservoir 3 to be supplied with water from main reservoir 4. The upper part of ring 16 is engaged in a convexity 20 of the bottom of lid 10, having at the top of its lateral walls apertures 14 provided for the passage of steam.

Lid 10 for receiving juices is intended to be placed under a cooking receptacle (not shown in the figures) in order on the one hand to channel the steam toward apertures 14 and on the other hand to receive the juices flowing from the cooking receptacle or receptacles disposed above said lid. Thus, the juices flowing from the foods do not risk coming to mix with the water in the reservoir.

It is necessary to note that the joint 11 between the top of the main reservoir 4 and ring 16 delimiting the latter with secondary reservoir 3 is not sealed. By this fact, the pressure exerted on the air in the main reservoir, provoked by an increase in the level of water in the main reservoir, is evacuated along the wall separating the main reservoir and the secondary reservoir.

When the level of water decreases, wall 5 separating the filling reservoir always performs its function. In effect, silicone seal 7 forms an annular rib 24, and extends slightly above the height of the passage under wall 5, with as its effect that heating body 2 is no longer supplied with water while water is present under the base of the two reservoirs (main and filling) in a zone 17 where it is at a lower level with respect to rib 24. Water thus ensures the closing of the lower part of the volume of main reservoir 4 by a water seal. Steam can only escape through apertures 14.

Seal 7 can be replaced by any protuberance, for example a rib rising from the bottom to a corresponding height.

When the level of water decreases, the generation of steam in main reservoir 4 increases, the temperature having a tendency to increase since the mass of water in main reservoir 4 decreases. When the level of water descends to the level of the passage between the two reservoirs thus permitting the steam generated around heating body 2 to escape toward main reservoir 4, the closing of the air volume of main reservoir 4 is always assured. In effect, the height of passage toward secondary reservoir 3 being higher than that separating main reservoir 4 and filling reservoir 6, water is always found under wall 5 assuring the blocking function and preventing steam from flowing back into filling reservoir 6. When the level of water decreases further in order to descend below wall 5, the water no longer arrives in contact with heating body 2 thanks to the silicone seal 7 and the steam generation process is interrupted.

Thus, when the appliance is used on a horizontal support, steam cannot pass at any time into the filling reservoir, and consequently steam cannot escape through the filling orifice at any time.

In order to facilitate the introduction of water from the outside, use is made of handles 9 as a receiving lip. In order to permit the user to introduce water at a rapid rate, it is important that the cross section connecting main reservoir 4 to filling reservoir 6 be large. This object is attained by the fact that wall 5 forms a skirt under lid 10 for receives juices and extends over the entire periphery of the base offering a passage surface sufficient for rapid equalization of the level of water.

On FIG. 2, lid 10 for receiving juices is illustrated in perspective allowing viewing under its bottom of the skirt formed by wall 5. This skirt is continuous in order to capture the steam generated in the main reservoir and prevent it from passing into the filling volume. There will also be seen two handles 9 in the form of receiving lips disposed on lid 10, offering a good opening for filling water. Heating body 2 and ring 16 are not shown on base 1.

By way of variant, seal 7 forming rib 24 can be replaced by a seal 7' forming a slope, or slope, 23 surrounding the base of heating block 2, heating block 2 emerging at the top of slope 23, as shown in FIG. 4. It will also be noted that secondary reservoir 3 and main reservoir 4 are delimited by a ring 16' emerging from the base of lid 10. The lower part of ring 16' provides an annular passage between secondary reservoir 3 and main reservoir 4. Vents 11' are disposed at the top of ring 16'. Vents 11' are oriented toward the top in convexity 20 forming the shaft in order to permit the evacuation of air in main reservoir 4 during filling while limiting the outlet of steam issuing from secondary reservoir 3 in which is disposed heating body 2.

FIG. 3 shows us a different embodiment while using the same principle. Wall 5 previously forming a unit with the bottom of lid 10 for receiving juices is, in this configuration, fixed on the edge of said lid 10 and extends to a channel 12 formed along main reservoir 4. An annular rib 24' delimits thus main reservoir 4 and the zone 17 of lower height formed by channel 12. It will be noted that the height of channel 12 is greater than that of the bottom of main reservoir 4, which permits reducing the height of wall 5. In order that the filling of this reservoir is performed from the top, i.e. by the lifting of lid 10 for receiving juices or via filling orifice 8, channel 12 is in the two cases in question filled with water. This water ensures the closing of the volume situated above the level of water in main reservoir 4. As mentioned previously, the temperature at the periphery of the water reservoir is in the vicinity of 50° C., thus water in the channel will not undergo evaporation. Its function of obstructing the steam generated in main reservoir 4 will remain regardless of the level of water in the reservoir. For correct functioning, channel 12 is placed preferably around the entire periphery of main reservoir 4.

Although water remains the preferred variant of the invention, the function of obstruction can be performed by other means, for example by the disposition of a rubber seal. According to the embodiment of FIGS. 1 and 2, the skirt formed by wall 5 can be replaced by a wall having on its lateral extremities seals provided to come into contact with the lateral walls of base 1, a passage being arranged between the lower extremity of said wall and the bottom of the reservoir, such a wall being disposed opposite each orifice 8. Water present in the zone of reduced height 17 and the seals then form a steam obstruction.

Other forms of construction can permit, although more complicated, obtaining the same result. In effect, the skirt formed by wall 5 can be equally an element independent of lid 10 for receiving juices. In this case, it is sufficient to fix on the upper section, a tubular seal guaranteeing the closing of the volume above the main reservoir. In this case, this wall 5 in the form of a ring can be either an independent element placed on the bottom or forming a unit therewith; in the two cases in question, orifices at its base permit the water to circulate.

Until the present, one has been satisfied with a visual indication of the level of water and an acoustic indicator when the generation of steam is terminated to due lack of water. With this configuration, it becomes useful to inform the user before this extreme in order to allow him the possibility of adding further water if he desires. To this effect, a water level detector is associated with an audible indicator and signals when the level of water reaches, for example, the last quarter. The user does not have a need to oversee his appliance and can add the water in the course of cooking.

The example of construction shown in FIG. 5 distinguishes from the preceding examples in that the lower height zone 17 is delimited on the one hand by a lateral wall of base 1 and on the other hand by a slope 23' connecting said lower height zone to a zone of reservoir 4 in which is disposed heating body 2. Lid 10 has a conduit 27 whose upper part forms the filling orifice 8 and whose lower part forms the tubular wall 5 opening into the lower height zone 17 when lid 10 is placed on base 1. The top of slope 23' has a height greater than the lower extremity of wall 5. Since wall 5 does not surround heating body 2, escape of steam between lid 10 and base 1 must be avoided in order for the steam to escape through orifice or orifices 14 arranged in the lid. For this purpose, sealing means are provided between lid 10 and base 1. As shown in FIG. 5, lid 10 comes to bear on an annular rim 26 formed by a joint over molded on the top of the peripheral lateral wall of base 1.

By way of variation, slope 23' can be replaced by a rib. By way of a complimentary variant, conduit 27 could be formed in the lateral wall of base 1. Other embodiments can be envisioned for the sealing means.

Numerous improvements can be supplied to this appliance in the framework of the claims.

Particularly, lid 10 closing main reservoir 4 and under which is disposed skirt 5 can be formed by the bottom of a cooking receptacle, intended to receive foods to be cooked and having at least opening for passage of steam disposed opposite the secondary steaming reservoir.

The holding means formed by handles 9 can be mounted on base 1 in place of lid 10.

Filling orifices 8 shown in the figures can be supplied with filters for preventing scale or intended to halt the particles. Notably, these filters can be mounted in handles 9.

Filling orifices 8 can equally be arranged in a removable part of base 1.

Filling orifices 8 can equally be arranged between base 1 and lid 10.

The present invention finds its application in steamers, in particular electric, having a base structure to produce steam, surmounted by a cooking receptacle.

What is claimed is:

1. Heating part of a steamer, said heating part comprising a base structure (1), a heating body (2), a main water reservoir (4) communicating with the heating body (2) and enclosing an air volume, a lid (10) closing the reservoir (4), a filling orifice (8) opening on an exterior wall of at least one of the base (1) and the lid (10), a wall (5) closing at least one part of the air volume enclosed by the water reservoir (4) and disposed between the heating body (2) and of the filling orifice (8), the lid (10) having at least one opening (14) provided for the passage of steam toward a cooking receptacle disposed above the lid, wherein the wall (5) descends into a reduced height zone (17) connected to the heating body (2') by a slope (23, 23') having a peak or a rib (24, 24') having a peak, the wall (5) descending into the reduced height zone (17) to a height lower than that of the peak of the slope (23, 23') or of the rib (24, 24'), the filling orifice (8) on the one hand and the slope (23, 23') or the rib (24, 24') on the other hand being disposed to one side and the other of the wall (5).

2. Heating part according to claim 1, further comprising a secondary water reservoir (3) for containing water that is in direct contact with the heating body (2), the main water reservoir (4) having a lower part communicating with the secondary reservoir (3) and the heating body (2) being disposed at the interior of the secondary reservoir (3).

3. Heating part according to claim 1, wherein the lid has a lower face and the wall (5) emerges from the lower face of the lid (10).

4. Heating part according to claim 3, wherein the main water reservoir has a periphery and a bottom and the rib (24') is disposed at the periphery of the main water reservoir (4) and provides a channel (12) having a base that is raised with respect to the bottom of the main water reservoir (4).

5. Heating part according to claim 1 wherein the wall (5) forms an annular skirt creating, in the main water reservoir (4), a filling volume communicating with the filling orifice (8).

6. Heating part according to claim 5, wherein the slope (23) or the (rib 24) is formed by an elastomer seal (7) disposed around the heating body (2) at the interior of the secondary reservoir (3).

7. Heating part according to claim 1 wherein the wall (5) forms a conduit (27) having an upper part that constitutes the filling orifice (8).

8. Heating part according to claim 1, further comprising holding means (9) mounted on the lid (10) or the base structure (1), and wherein the filling orifice (8) is integrated into the holding means (9).

9. Heating part according to claim 1, further comprising a filter provided in the filling orifice.

* * * * *